Figure 1:
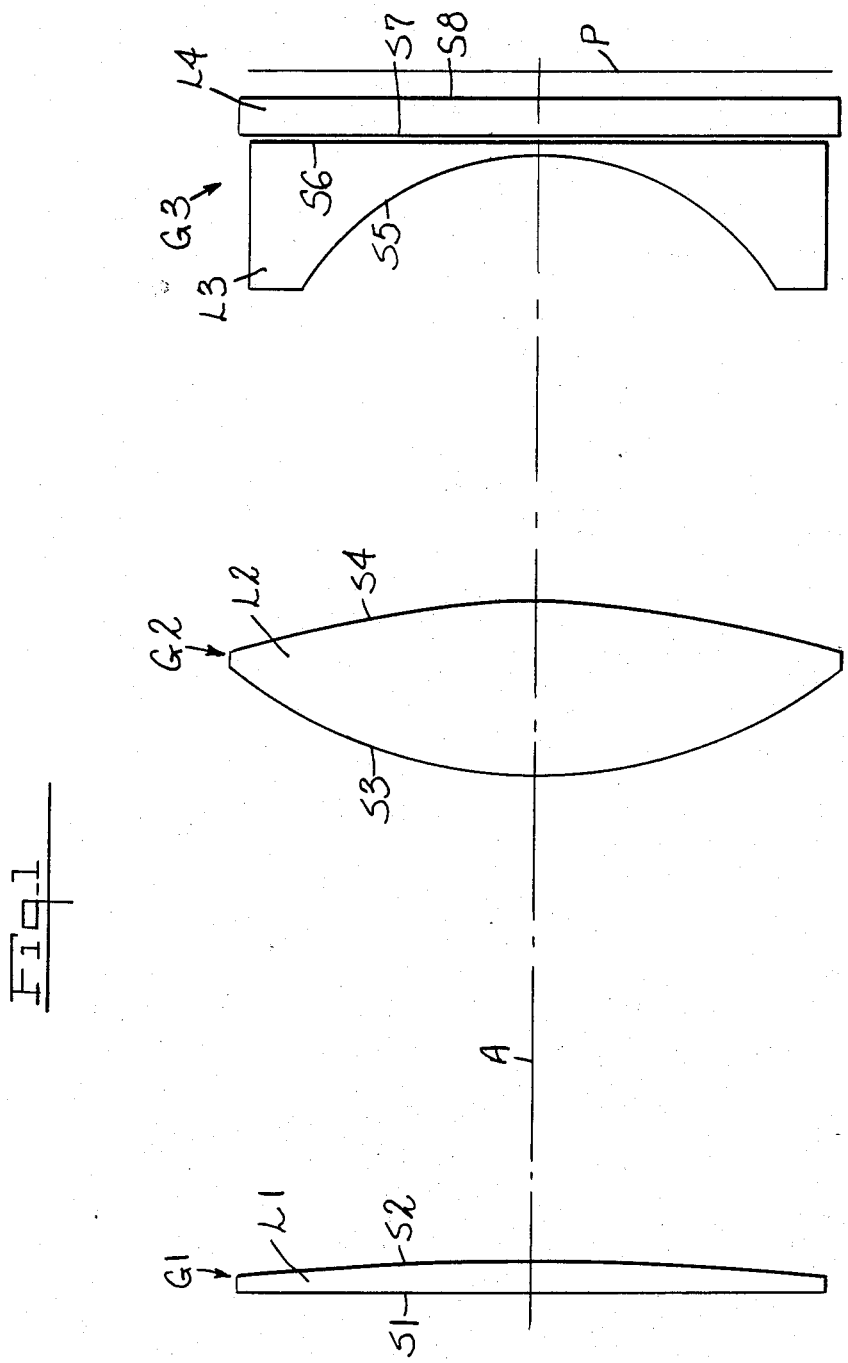

United States Patent [19]

Betensky

[11] 4,300,817
[45] Nov. 17, 1981

[54] PROJECTION LENS

[75] Inventor: Ellis I. Betensky, Tel Aviv, Israel

[73] Assignee: U.S. Precision Lens Incorporated, Cincinnati, Ohio

[21] Appl. No.: 70,748

[22] Filed: Sep. 5, 1979

Related U.S. Application Data

[63] Continuation-in-part of Ser. No. 940,724, Sep. 8, 1978, abandoned.

[51] Int. Cl.³ .............. G02B 3/04; G02B 9/12; G02B 27/18
[52] U.S. Cl. .............. 350/412; 350/432; 350/477
[58] Field of Search .............. 350/189, 190, 191, 192, 350/228, 224, 175 FS, 432, 433, 434, 435, 477, 473, 412

[56] References Cited

U.S. PATENT DOCUMENTS

| 2,440,088 | 4/1948 | Grey | 350/228 |
| 2,649,021 | 8/1953 | Angenieux | 350/224 |
| 3,429,997 | 2/1969 | Rösner et al. | 350/224 X |
| 3,800,085 | 3/1974 | Ambats | 350/189 X |
| 3,868,173 | 2/1975 | Miles et al. | 350/189 X |

FOREIGN PATENT DOCUMENTS 593514  10/1947  United Kingdom ............ 350/224

Primary Examiner—John K. Corbin
Assistant Examiner—Scott J. Sugarman
Attorney, Agent, or Firm—DeLio and Montgomery

[57] ABSTRACT

A projection lens for cathode ray tube display comprising from the image end an element of relatively weak optical power a bi-convex element of positive power providing substantially all the positive power of the overall lens and a third group comprising a negative element having a concave image side surface serving as a field flattener.

37 Claims, 2 Drawing Figures

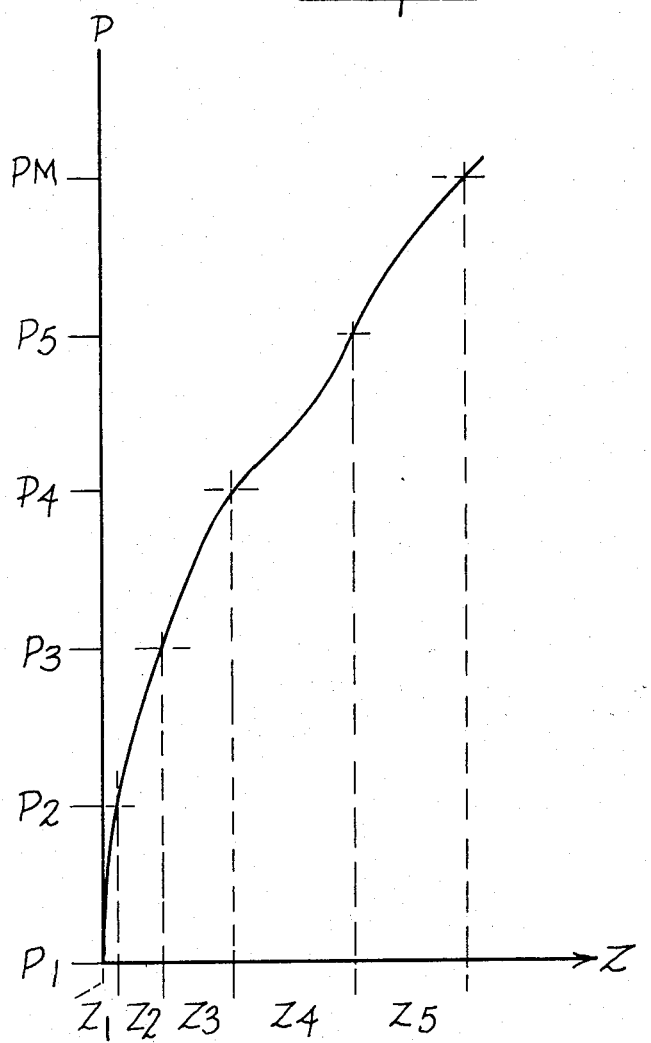

PROJECTION LENS

This application is a continuation-in-part of application Ser. No. 940,724, filed Sept. 8, 1978, now abandoned.

This invention relates to projection lenses and more particularly relates to lenses adapted to project an enlargement of an image appearing on a cathode ray tube (CRT) such as the screen of a television set.

When projecting an object such as a one color CRT as used in three-tube color projection television systems, it is often not necessary to correct the chromatic aberration due to the limited band widths of each CRT. Conventional types of objectives have thus far been used but with the elimination of the need for materials of different dispersions. These objectives, however, are still complex design forms due to the need to correct other aberrations. Even with the addition of aspherical surfaces, such objectives have negative power in the vicinity of the principal points. Since the total objective optical power must be positive, such objectives are complex and tend to be sensitive to manufacturing variation. Accordingly, the present invention provides a projection lens in which the sum of the positive optical power is minimized, thus reducing complexity and manufacturing difficulty, and further utilizes only three groups which may be divided for increased aperture or field but which, in the simplest form, each group comprises a single element.

Briefly stated, the invention in one form thereof comprises from the image end a first group which is an aperture dependent aberration corrector element of essentially no optical power, a second positive group providing essentially all of the positive power of the lens, and a third group which corrects for field curvature and in some cases distortion. In its simplest form, the corrector and field flattener each have one plano surface. The elements may also have aspheric surfaces. To reduce the number of elements needed, at least one aspheric surface for each group is preferred. The powers of the groups are chosen in a range related to unity power of the overall lens as follows:

| | | | | |
|---|---|---|---|---|
| .4 $K_o$ | > | K1 | > | .1 $K_o$ |
| 1.1 $K_o$ | > | K2 | > | .85 $K_o$ |
| −1.9 $K_o$ | > | K3 | > | −1.0 $K_o$ |

An object of this invention is to provide a new and improved projection lens for a CRT.

Another object of this invention is to provide a new and improved projection lens for a CRT of reduced complexity and manufacturing difficulty.

The features of the invention which are believed to be novel are particularly pointed out and distinctly claimed in the concluding portion of this specification.

The invention, however, both as to its organization and operation, together with further objects and advantages thereof may best be appreciated by reference to the following detailed description taken in conjunction with the drawings, wherein:

FIG. 1 illustrates a side elevation of a general lens form embodying the invention; and FIG. 2 is graphic, helpful in explaining how a lens surface is generated as a spline of rotation.

The third group G3 comprises an element L3 having surfaces S5 and S6 and an element L4 having surfaces S7 and S8. The element L3 is of negative power and is a field flattener. The fourth element L4 is primarily a radiation shield, if used, and contributes no optical power to the lens. The plane P represents the face of a CRT.

A lens embodying the invention preferably has aspheric surfaces, one or more on each of the three elements L1, L2 and L3, as will be made apparent from the examples in the following tables. The aspheric surfaces may be defined by the following equation:

$$X = \frac{Cy^2}{1 + \sqrt{1 - (1 + K)C^2 y^2}} + Dy^4 + Ey^6 + Fy^8 + Gy^{10}$$

where

X is the surface sag at a semi-aperture distance y from the axis A of the lens,

C is the curvature of a lens surface at the optical axis A equal to the reciprocal of the radius at the optical axis, K is a conic constant or other surfaces of revolution.

The aspheric surfaces may also be defined as splines of rotation as hereinafter explained.

A lens embodying the invention comprises three groups G1, G2 and G3 from the image end. Each group in the simplest form comprises a single element. Group G1, as shown, comprises a single element L1 of very weak positive optical power spaced substantially from element L2 of group G2. Element L1 corrects aperture dependent aberrations. Element L1 in its simplest form has one plano surface and one aspheric surface.

Element L2 is bi-convex with at least one aspheric surface, and provides essentially all the positive power of the overall lens.

Group G3 comprises element L3 which is negative with a concave image side surface S5. In the simplest form the object side surface is plano. Generally, the image side surface S5 is aspheric.

Element L3 serves as a field flattener essentially correcting the Petzval curvature of elements L1 and L2.

The element L4 is a radiation shield usually used with a monochromatic CRT projection system. The surface of the CRT is designated P.

The following examples in Tables I-III are exemplary of lenses embodying the invention having semi-field angles of twenty to twenty-five degrees. The lenses of Tables I-III have surfaces defined by the foregoing aspheric equation, while the lenses of Tables IV-VIII have surfaces defined as splines of rotation as hereinafter described. In the tables, the surface radius denoted by S followed by the surface number is the radius at the optical axis, $N_d$ is the index of refraction and $V_d$ is the Abbe number. Positive surface radii are struck from the right and negative radii are struck from the left. The object is to the right at the surface of the CRT. The radiation shielding element L4 is generally present, but is a consideration, not an important element in the lens design.

The lenses of Tables I-III, and V-VIII are useful primarily for monochromatic CRT's, and are not color corrected. The lens of Table IV is useful with a color CRT, and does not include the radiation shield L4. In Table IV, the surfaces S7 and S8 are the screen of the CRT. In all tables the screen of the CRT is shown only to give the front vertex distance of the lens (the axial distance from surface S1 to the screen).

In the tables the relative aperture is measured from the short conjugate.

TABLE I

A lens as shown in FIG. 1 scaled to an EFL of 135mm and relative aperture of f/1.2 is described substantially as follows:

| | | Surface Radius (mm) | Axial Distance Between Surfaces (mm) | $N_d$ | $V_d$ |
|---|---|---|---|---|---|
| L1 | S1 | ∞ | 7.00 | 1.491 | 57.2 |
| | S2 | −395.19 | 102.52 | | |
| | S3 | 105.62 | 36.00 | | |
| L2 | | | | 1.491 | 57.2 |
| | S4 | −157.26 | 92.76 | | |
| | S5 | −65.91 | 4.00 | | |
| L3 | | | | 1.491 | 57.2 |
| | S6 | ∞ | 1.00 | | |
| | S7 | ∞ | 8.00 | | |
| L4 | | | | 1.491 | 57.2 |
| | S8 | ∞ | 5.50 | | |

Aspheric Surfaces: S2, S4, and S5
Aspheric Coefficients:

| | S2 | S4 | S5 |
|---|---|---|---|
| D | $.1657 \times 10^{-6}$ | $.1481 \times 10^{-6}$ | $-.1987 \times 10^{-5}$ |
| E | $-.3850 \times 10^{-10}$ | $.3366 \times 10^{-11}$ | $.4057 \times 10^{-12}$ |
| F | $.1293 \times 10^{-13}$ | $-.9780 \times 10^{-15}$ | $.9117 \times 10^{-9}$ |
| G | $-.1424 \times 10^{-17}$ | $.6978 \times 10^{-19}$ | $.6054 \times 10^{-16}$ |

Conic Constant:

| K = | .010 | −1.00 | −1.00 |
|---|---|---|---|

TABLE II

A lens as shown in FIG. 1 scaled to an EFL of 135mm and a relative aperture of f/1.09 is described substantially as follows:

| | | Surface Radius (mm) | Axial Distance Between Surfaces (mm) | $N_d$ | $V_d$ |
|---|---|---|---|---|---|
| L1 | S1 | ∞ | 7.00 | 1.491 | 57.2 |
| | S2 | −512.41 | 114.03 | | |
| | S3 | 96.92 | 42.00 | | |
| L2 | | | | 1.491 | 57.2 |
| | S4 | −161.68 | 89.43 | | |
| | S5 | −63.84 | 3.00 | | |
| L3 | | | | 1.491 | 57.2 |
| | S6 | ∞ | .10 | | |
| | S7 | ∞ | 12.50 | | |
| L4 | | | | 1.491 | 57.2 |
| | S8 | ∞ | 5.50 | | |

Aspheric Surfaces: S2, S3, S4, and S5
Aspheric Coefficients:

| | S2 | S3 | S4 | S5 |
|---|---|---|---|---|
| D | $.1170 \times 10^{-6}$ | $-.7413 \times 10^{-7}$ | $.1422 \times 10^{-6}$ | $-.1517 \times 10^{-5}$ |
| E | $-.2291 \times 10^{-6}$ | $.3211 \times 10^{-11}$ | $.1141 \times 10^{-11}$ | $.8428 \times 10^{-9}$ |
| F | $.8188 \times 10^{-14}$ | $-.3803 \times 10^{-15}$ | $-.1251 \times 10^{-15}$ | $-.3809 \times 10^{-12}$ |
| G | $-.8926 \times 10^{-18}$ | $-.7314 \times 10^{-19}$ | $-.1817 \times 10^{-20}$ | $.5421 \times 10^{-16}$ |

Conic Constant:

| K = | .3735 | −.010 | −1.0539 | −1.0312 |
|---|---|---|---|---|

TABLE III

A lens as shown in FIG. 1 scaled to an EFL of 135mm and a relative aperture of f/1.20 is described substantially as follows:

| | | Surface Radius (mm) | Axial Distance Between Surfaces (mm) | $N_d$ | $V_d$ |
|---|---|---|---|---|---|
| L1 | S1 | ∞ | 7.00 | 1.491 | 57.2 |
| | S2 | −380.24 | 101.52 | | |
| | S3 | 106.37 | 36.00 | | |
| L2 | | | | 1.491 | 57.2 |
| | S4 | −154.53 | 91.66 | | |
| | S5 | −61.31 | 4.00 | | |
| L3 | | | | 1.491 | 57.2 |
| | S6 | ∞ | 1.00 | | |
| | S7 | ∞ | 8.00 | | |
| L4 | | | | 1.491 | 57.2 |
| | S8 | ∞ | 5.50 | | |

Aspheric Surfaces: S2, S4, and S5
Aspheric Coefficients:

| | S2 | S4 | S5 |
|---|---|---|---|
| D | $.1667 \times 10^{-6}$ | $.1425 \times 10^{-6}$ | $.2362 \times 10^{-7}$ |
| E | $-.3704 \times 10^{-10}$ | $.4427 \times 10^{-11}$ | $-.6453 \times 10^{-10}$ |
| F | $.1238 \times 10^{-13}$ | $-.9792 \times 10^{-15}$ | $-.2695 \times 10^{-13}$ |
| G | $-.1362 \times 10^{-17}$ | $.6111 \times 10^{-19}$ | $.1780 \times 10^{-16}$ |

Conic Constant:

| K = | .010 | −1.00 | −.010 |
|---|---|---|---|

In the following examples of Tables IV-VIII, the aspheric surfaces are defined as splined surfaces of rotation as explained by A. K. Rigler and T. P. Vogt in the July, 1971 issue of "Applied Optics", Vol. 10, No. 7, pp. 1648-1651.

With reference to FIG. 2, the sag Z is described as a cubic function of $p_m$, the half surface height. In FIG. 2, the value of $p_m$ is one half the clear aperture of the surface and the increments $p_1-p_2$; $p_2-p_3$; $p_3-p_4$; $p_4-p_5$; and $p_m-p_5$ are equal divisions or zones $Z_1-Z_5$ of the half clear aperture of the lens surface.

The height of the lens surface may be divided into a number of zones necessary to define the lens surface.

There is a cubic equation for each zone from $Z_1$ to $Z_n$, where $$Z_n = a_n + b_n(P_n - P_{n-1}) + \frac{C_n}{2}(P_n - P_{n-1})^2 + \frac{d_n}{6}(P_n - P_{n-1})^3$$

In each zone equation, $p_1$ indicates the starting surface height of its zone $Z_1$, $d_1$ are coefficients which are associated with the i th zone. and the $a_1$, $b_1$, $c_1$ coefficients are derived from $p_1$ and $d_1$ so that the first and second derivatives of $Z_1$ are continuous at the beginning of each zone, but the third derivative is discontinuous.

The descriptive equations of the zones $Z_1$-$Z_5$ defining the aspheric surfaces are $$Z_1 = a_1 + b_1 p_1 + \frac{C_1}{2} p_1^2 + \frac{d_1}{6} p_1^3$$

$$Z_2 = a_2 + b_2 (p_2 - p_1) + \frac{C_2}{2} (p_2 - p_1)^2 + \frac{d_2}{6} (p_2 - p_1)^3$$

$$Z_3 = a_3 + b_3 (p_3 - p_2) + \frac{C_2}{2} (p_3 - p_2)^2 + \frac{d_3}{6} (p_3 - p_2)^3$$

$$Z_4 = a_4 + b_4 (p_4 - p_3) + \frac{C_2}{2} (p_4 - p_3)^2 + \frac{d_4}{6} (p_4 - p_3)^3$$

$$Z_5 = a_5 + b_5 (p_5 - p_4) + \frac{C_2}{2} (p_5 - p_4)^2 + \frac{d_5}{6} (p_5 - p_4)^3$$

In the examples given, the five zones of p which are equal divisions of the surface height require only the coefficients $d_1$, $d_2$, $d_3$, $d_4$ and $d_5$ to completely specify the surface for a given clear aperture (CA). The spherical radii given in the prescription tables is the initial curvature at the optical axis.

TABLE IV

A lens as shown in FIG. 1 scaled to an EFL of 300mm and relative aperture of f/1.65 is described substantially as follows:

| | | Surface Radius (mm) | Axial Distance Between Surfaces (mm) | $N_d$ | $V_d$ |
|---|---|---|---|---|---|
| L1 | S1 | 521.31 | 20.00 | 1.491 | 57.2 |
| | S2 | ∞ | 319.32 | | |
| L2 | S3 | 241.48 | 65.00 | 1.491 | 57.2 |
| | S4 | −345.77 | 191.14 | | |
| L3 | S5 | −74.54 | 6.67 | 1.491 | 57.2 |
| | S6 | −902.23 | 61.57 | | |
| L4 | S7 | 550.00 | 6.67 | 1.491 | 57.2 |
| | S8 | 550.00 | .03 | | |

Aspheric Surfaces: S1, S3, S4 and S5

| Surface | Clear Aperture | $d_1$ | $d_2$ | $d_3$ | $d_4$ | $d_5$ |
|---|---|---|---|---|---|---|
| 1 | 350.2mm | $-.1339 \times 10^{-5}$ | $-.1157 \times 10^{-4}$ | $-.2105 \times 10^{-4}$ | $-.3353 \times 10^{-4}$ | $-.1091 \times 10^{-3}$ |
| 3 | 264.9mm | $-.6323 \times 10^{-6}$ | $.9887 \times 10^{-5}$ | $.2084 \times 10^{-4}$ | $.4407 \times 10^{-4}$ | $.5742 \times 10^{-4}$ |
| 4 | 263.1mm | $.2283 \times 10^{-5}$ | $.1260 \times 10^{-4}$ | $.3264 \times 10^{-4}$ | $.2877 \times 10^{-4}$ | $.2647 \times 10^{-4}$ |
| 5 | 203.5mm | $.3889 \times 10^{-4}$ | $.8169 \times 10^{-4}$ | $.4280 \times 10^{-4}$ | $.1134 \times 10^{-3}$ | .9075 |

TABLE V

A lens as shown in FIG. 1 scaled to an ELF of 127mm and a relative aperture of f/1.09 is described substantially as follows:

| | | Surface Radius (mm) | Axial Distance Between Surfaces (mm) | $N_d$ | $V_d$ |
|---|---|---|---|---|---|
| L1 | S1 | 301.79 | 10.00 | 1.491 | 57.2 |
| | S2 | ∞ | 80.25 | | |
| L2 | S3 | 85.57 | 42.00 | 1.491 | 57.2 |
| | S4 | −175.33 | 72.67 | | |
| L3 | S5 | −51.53 | 3.00 | 1.491 | 57.2 |
| | S6 | 351.42 | 0 | | |
| L4 | S7 | ∞ | 12.5 | 1.491 | 57.2 |
| | S8 | ∞ | 5.59 | | |

Aspheric Surfaces: S1, S4, S5 and S6

| Surface | Clear Aperture | $d_1$ | $d_2$ | $d_3$ | $d_4$ | $d_5$ |
|---|---|---|---|---|---|---|
| 1 | 131.0mm | $-.3644 \times 10^{-5}$ | $-.8165 \times 10^{-4}$ | $-.1221 \times 10^{-3}$ | $-.2479 \times 10^{-3}$ | $-.4656 \times 10^{-3}$ |
| 4 | 128.6mm | $.3149 \times 10^{-4}$ | $.9809 \times 10^{-4}$ | $.1503 \times 10^{-3}$ | $.2306 \times 10^{-3}$ | $.2190 \times 10^{-3}$ |
| 5 | 87.0mm | $.2611 \times 10^{-3}$ | $-.2312 \times 10^{-2}$ | $.5645 \times 10^{-3}$ | $-.1836 \times 10^{-2}$ | $-.8412 \times 10^{-2}$ |
| 6 | 120.00mm | $-.2975 \times 10^{-3}$ | $-.1110 \times 10^{-2}$ | $.8117 \times 10^{-3}$ | $-.5917 \times 10^{-3}$ | $-.3518 \times 10^{-2}$ |

TABLE VI

A lens as shown in FIG. 1 scaled to an EFL of 135mm and a relative aperture of f/1.09 is described substantially as follows:

| | Surface | Surface Radius (mm) | Axial Distance Between Surfaces (mm) | $N_d$ | $V_d$ |
|---|---|---|---|---|---|
| L1 | S1 | 223.69 | | | |
| | | | 10.00 | 1.491 | 57.2 |
| | S2 | ∞ | | | |
| | | | 72.08 | | |
| | S3 | 108.36 | | | |
| | | | 42.00 | | |
| L2 | | | | 1.491 | 57.2 |
| | S4 | −167.46 | | | |
| | | | 77.00 | | |
| | S5 | −57.16 | | | |
| | | | 3.00 | | |
| L3 | | | | 1.491 | 57.2 |
| | S6 | ∞ | | | |
| | | | 0 | | |
| | S7 | ∞ | | | |
| | | | 12.50 | | |
| L4 | | | | 1.491 | 57.2 |
| | S8 | ∞ | | | |
| | | | 5.59 | | |

Aspheric Surfaces: S1, S3, S4, S5, S6

| Surface | Clear Aperture | $d_1$ | $d_2$ | $d_3$ | $d_4$ | $d_5$ |
|---|---|---|---|---|---|---|
| 1 | 159.9mm | $-.1218 \times 10^{-4}$ | $-.8022 \times 10^{-4}$ | $-.1247 \times 10^{-3}$ | $-.2662 \times 10^{-3}$ | $-.4792 \times 10^{-3}$ |
| 3 | 140.0mm | $.2623 \times 10^{-4}$ | $.9881 \times 10^{-4}$ | $.1802 \times 10^{-3}$ | $.2040 \times 10^{-3}$ | $-.2553 \times 10^{-3}$ |
| 4 | 138.4mm | $.1829 \times 10^{-4}$ | $.7667 \times 10^{-4}$ | $.8617 \times 10^{-4}$ | $.2826 \times 10^{-4}$ | $-.9310 \times 10^{-4}$ |
| 5 | 90.9mm | $-.1180 \times 10^{-2}$ | $.7727 \times 10^{-3}$ | $-.1321 \times 10^{-2}$ | $-.2786 \times 10^{-2}$ | $-.5550$ |
| 6 | 130.0mm | $-.1590 \times 10^{-2}$ | $.1300 \times 10^{-2}$ | $-.5869 \times 10^{-3}$ | $-.8199 \times 10^{-3}$ | $-.1199 \times 10^{-2}$ |

TABLE VII

A lens as shown in FIG. 1 scaled to an EFL of 127mm and a relative aperture of f/1.09 is described substantially as follows:

| | Surface | Surface Radius (mm) | Axial Distance Between Surfaces (mm) | $N_d$ | $V_d$ |
|---|---|---|---|---|---|
| L1 | S1 | 237.45 | | | |
| | | | 10.00 | 1.491 | 57.2 |
| | S2 | ∞ | | | |
| | | | 71.28 | | |
| | S3 | 93.45 | | | |
| | | | 42.00 | | |
| L2 | | | | 1.491 | 57.2 |
| | S4 | −166.02 | | | |
| | | | 70.77 | | |
| | S5 | −61.94 | | | |
| | | | 3.00 | | |
| L3 | | | | 1.491 | 57.2 |
| | S6 | 163.78 | | | |
| | | | 0 | | |
| | S7 | ∞ | | | |
| | | | 12.5 | | |
| L4 | | | | 1.491 | 57.2 |
| | S8 | ∞ | | | |
| | | | 5.59 | | |

Aspheric Surfaces: S1, S3, S4, S5 and S6

| Surface | Clear Aperture | $d_1$ | $d_2$ | $d_3$ | $d_4$ | $d_5$ |
|---|---|---|---|---|---|---|
| 1 | 130.2mm | $-.1695 \times 10^{-4}$ | $-.8422 \times 10^{-4}$ | $-.1463 \times 10^{-3}$ | $-.3004 \times 10^{-3}$ | $-.5393 \times 10^{-3}$ |
| 3 | 130.6mm | $.3487 \times 10^{-4}$ | $.1080 \times 10^{-3}$ | $.1869 \times 10^{-3}$ | $.1941 \times 10^{-3}$ | $-.1384 \times 10^{-3}$ |
| 4 | 127.9mm | $.2274 \times 10^{-4}$ | $.8446 \times 10^{-4}$ | $.7853 \times 10^{-4}$ | $.4268 \times 10^{-4}$ | $-.3505 \times 10^{-4}$ |
| 5 | 81.0mm | $-.1439 \times 10^{-2}$ | $-.2149 \times 10^{-3}$ | $-.6393 \times 10^{-4}$ | $-.2034 \times 10^{-2}$ | $-.1134 \times 10^{-1}$ |
| 6 | 110.0mm | $-.1661 \times 10^{-2}$ | $.6148 \times 10^{-3}$ | $-.3317 \times 10^{-4}$ | $-.8751 \times 10^{-3}$ | $-.5471 \times 10^{-2}$ |

TABLE VIII

A lens as shown in FIG. 1 scaled to an EFL of 135mm and a relative aperture of f/1.09 is described substantially TABLE VIII-continued as follows:

| | | Surface Radius (mm) | Axial Distance Between Surfaces (mm) | $N_d$ | $V_d$ |
|---|---|---|---|---|---|
| L1 | S1 | 215.86 | | 1.491 | 57.2 |
| | | | 10.00 | | |
| | S2 | ∞ | | | |
| | | | 66.191 | | |
| | S3 | 137.50 | | | |
| L2 | | | 42.00 | 1.491 | 57.2 |
| | S4 | −136.15 | | | |
| | | | 82.22 | | |
| | S5 | −65.47 | | | |
| L3 | | | 3.00 | 1.491 | 57.2 |
| | S6 | ∞ | | | |
| | | | 0 | | |
| | S7 | ∞ | | | |
| L4 | | | 12.5 | 1.491 | 57.2 |
| | S8 | ∞ | | | |
| | | | 5.59 | | |

Aspheric Surfaces: S1, S3, S4, and S5

| Surface | Clear Aperture | $d_1$ | $d_2$ | $d_3$ | $d_4$ | $d_5$ |
|---|---|---|---|---|---|---|
| 1 | 154.5mm | $-.2026 \times 10^{-4}$ | $-.8525 \times 10^{-4}$ | $-.1549 \times 10^{-3}$ | $-.3448 \times 10^{-3}$ | $-.8040 \times 10^{-3}$ |
| 3 | 140.7mm | $.2337 \times 10^{-4}$ | $.4685 \times 10^{-4}$ | $.1282 \times 10^{-3}$ | $.1955 \times 10^{-3}$ | $-.2588 \times 10^{-4}$ |
| 4 | 138.4mm | $.2105 \times 10^{-4}$ | $.4532 \times 10^{-4}$ | $.1085 \times 10^{-3}$ | $.7632 \times 10^{-4}$ | $-.2740 \times 10^{-4}$ |
| 5 | 98.1mm | $-.4460 \times 10^{-4}$ | $-.4340 \times 10^{-3}$ | $-.6891 \times 10^{-3}$ | $-.1342 \times 10^{-2}$ | $-.2958 \times 10^{-2}$ |

The powers K of the elements of the lenses of Tables I–VIII as a ratio to unity focal length of the overall lens are set forth in Table IX.

TABLE IX

| Lens | $K_{L1}$ | $K_{L2}$ | $K_{L3}$ |
|---|---|---|---|
| Table I | .162 | 1.013 | −1.013 |
| Table II | .135 | 1.040 | −1.040 |
| Table III | .176 | 1.013 | −1.080 |
| Table IV | .270 | .990 | −1.830 |
| Table V | .203 | 1.029 | −1.397 |
| Table VI | .297 | .959 | −1.472 |
| Table VII | .267 | .991 | −1.397 |
| Table VIII | .311 | .918 | −1.013 |

A lens embodying the invention, as shown by Table IX, has group powers as a ratio to the power of the overall lens as follows:

| G1 | .1 to .4 |
|---|---|
| G2 | .85 to 1.1 |
| G3 | −1.0 to −1.9 |

In the simplest form, as shown in Tables I, II, III, V, VI, VII, and VIII, each of elements L1 and L3 have one plano surface thus minimizing manufacturing difficulty.

Table X sets forth the spacing between the groups as a ratio of the axial spacing to the equivalent focal length.

TABLE X

| Table | G1−G2 | G2−G3 |
|---|---|---|
| I | .759 | .687 |
| II | .844 | .662 |
| III | .752 | .678 |
| IV | 1.06 | .638 |
| V | .630 | .572 |
| VI | .533 | .570 |
| VII | .527 | .524 |

TABLE X-continued

| Table | G1−G2 | G2−G3 |
|---|---|---|
| VIII | .490 | .609 | where G1−G2 is the axial spacing between groups G1 and G2, and G2−G3 is the axial spacing between groups G2 and G3.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A projection lens for a cathode ray tube display consisting of three groups, the first group from the image end comprising an element of weak optical power and serving primarily to correct for aperture dependent aberrations, the second group consisting of a bi-convex element of positive power and providing essentially all of the positive power of the overall lens, the third group comprising a negative element having a concave image side surface and serving as a field flattener essentially correcting the Petzval curvature of the elements of said first and second groups.

2. The lens of claim 1 where said three groups comprise three elements L1, L2, and L3, having optical powers K1, K2 and K3, the overall lens having an optical power of 1.0, and $$.4 > K1 > .1$$

-continued

| | | | | |
|---|---|---|---|---|
| 1.1 | > | K2 | > | .85 |
| −1.9 | > | K3 | > | −1.0 |

3. The lens of claim 1 where each group consists of one element, and the element of each of the first and third groups has a plano surface.

4. The lens of claim 3 where the element of each of said first and third groups has an aspheric surface.

5. The lens of claim 1 where the axial spacing between the surfaces of the second and third groups is between 0.5 and 0.7 of the equivalent focal length of said lens.

6. The lens of claim 1 wherein said second group consists of a single bi-convex element having at least one aspheric surface.

7. A lens according to claim 1 having lens surfaces defined by the following relationship:

$$X = \frac{Cy^2}{1 + \sqrt{1 - (1 + k) C^2 y^2}} + Dy^4 + Ey^6 + Fy^8 + Gy^{10}$$

where X is the surface sag at a semi-aperture distance y from the optical axis of the lens, k is a conic constant, D, E, F, and G are constants.

8. A lens according to claim 7 scaled to an EFL of 135 mm and a relative aperture of f/1.2 described substantially as follows:

| | | Surface Radius (mm) | Axial Distance Between Surfaces (mm) | $N_d$ | $V_d$ |
|---|---|---|---|---|---|
| L1 | S1 | ∞ | | | |
| | | | 7.00 | 1.491 | 57.2 |
| | S2 | −395.19 | | | |
| | | | 102.52 | | |
| L2 | S3 | 105.62 | | | |
| | | | 36.00 | | |
| | S4 | −157.26 | | 1.491 | 57.2 |
| | | | 92.76 | | |
| L3 | S5 | −65.91 | | | |
| | | | 4.00 | | |
| | S6 | ∞ | | 1.491 | 57.2 |

Aspheric Surfaces: S2, S4, and S5
Aspheric Coefficients:

| | S2 | S4 | S5 |
|---|---|---|---|
| D | $.1657 \times 10^{-6}$ | $.1481 \times 10^{-6}$ | $-.1987 \times 10^{-5}$ |
| E | $-.3850 \times 10^{-10}$ | $.3366 \times 10^{-11}$ | $.4057 \times 10^{-12}$ |
| F | $.1293 \times 10^{-13}$ | $-.9780 \times 10^{-15}$ | $.9117 \times 10^{-9}$ |
| G | $-.1424 \times 10^{-17}$ | $.6978 \times 10^{-19}$ | $.6054 \times 10^{-16}$ |

Conic Constant:

| K = | .010 | −1.00 | −1.00 |
|---|---|---|---|

Where $N_d$ is the index of refraction of the lens elements, $V_d$ is the dispersion of the lens measured by its Abbe number, S1-S6 are successive lens surfaces, the surfaces where positive are on radii struck from the right and where negative are on radii struck from the left, and surfaces S2, S4 and S5 are aspheric as shown.

9. A lens according to claim 7 scaled to an EFL of 135 mm and a relative aperture of f/1.09 described substantially as follows:

| | | Surface Radius (mm) | Axial Distance Between Surfaces (mm) | $N_d$ | $V_d$ |
|---|---|---|---|---|---|
| L1 | S1 | ∞ | | | |
| | | | 7.00 | 1.491 | 57.2 |
| | S2 | −512.41 | | | |
| | | | 114.03 | | |
| L2 | S3 | 96.92 | | | |
| | | | 42.00 | 1.491 | 57.2 |
| | S4 | −161.68 | | | |
| | | | 89.43 | | |
| L3 | S5 | −63.84 | | | |
| | | | 3.00 | | |
| | S6 | ∞ | | 1.491 | 57.2 |

Aspheric Surfaces: S2, S3, S4, and S5
Aspheric Coefficients:

| | S2 | S3 | S4 | S5 |
|---|---|---|---|---|
| D | $.1170 \times 10^{-6}$ | $-.7413 \times 10^{-7}$ | $.1422 \times 10^{-6}$ | $-.1517 \times 10^{-5}$ |
| E | $-.2291 \times 10^{-6}$ | $.3211 \times 10^{-11}$ | $.1141 \times 10^{-11}$ | $.8428 \times 10^{-9}$ |
| F | $.8188 \times 10^{-14}$ | $-.3803 \times 10^{-15}$ | $-.1251 \times 10^{-15}$ | $-.3809 \times 10^{-12}$ |
| G | $-.8926 \times 10^{-18}$ | $-.7314 \times 10^{-19}$ | $-.1817 \times 10^{-20}$ | $.5421 \times 10^{-16}$ |

Conic Constant:

| K = | .3735 | −.010 | −1.0539 | −1.0312 |
|---|---|---|---|---|

Where $N_d$ is the index of refraction of the lens elements, $V_d$ is the dispersion of the lens measured by its Abbe number, S1-S6 are successive lens surfaces, the surfaces where positive are on radii struck from the right and where negative are on radii struck from the left, and surfaces S2, S3, S4 and S5 are aspheric as shown.

10. A lens according to claim 7 scaled to an EFL of 135 mm and a relative aperture of f/1.20 described substantially as follows:

| | | Surface Radius (mm) | Axial Distance Between Surfaces (mm) | $N_d$ | $V_d$ |
|---|---|---|---|---|---|
| L1 | S1 | ∞ | | | |
| | | | 7.00 | 1.491 | 57.2 |
| | S2 | −380.24 | | | |
| | | | 101.52 | | |
| L2 | S3 | 106.37 | | | |
| | | | 36.00 | 1.491 | 57.2 |
| | S4 | −154.53 | | | |
| | | | 91.66 | | |
| L3 | S5 | −61.31 | | | |
| | | | 4.00 | | |
| | S6 | ∞ | | 1.491 | 57.2 |

Aspheric Surfaces: S2, S4 and S5
Aspheric Coefficients:

| | S2 | S4 | S5 |
|---|---|---|---|
| D | $.1667 \times 10^{-6}$ | $.1425 \times 10^{-6}$ | $.2362 \times 10^{-7}$ |
| E | $-.3704 \times 10^{-10}$ | $.4427 \times 10^{-11}$ | $-.6453 \times 10^{-10}$ |

-continued

| | | | |
|---|---|---|---|
| F | $.1238 \times 10^{-13}$ | $-.9792 \times 10^{-15}$ | $-.2695 \times 10^{-13}$ |
| G | $-.1362 \times 10^{-17}$ | $.6111 \times 10^{-19}$ | $.1780 \times 10^{-16}$ |

Conic Constant:

| | | | |
|---|---|---|---|
| K = | .010 | −1.00 | −.010 |

Where $N_d$ is the index of refraction of the lens elements, $V_d$ is the dispersion of the lens measured by its Abbe number, S1–S6 are successive lens surfaces, the surfaces where positive are on radii struck from the right and where negative are on radii struck from the left, and surfaces S2, S4 and S5 are aspheric as shown.

11. The lens of claim 1 where at least one lens surface is defined as a spline of rotation where the sag of the surface along an abscissa Z from an ordinate P is defined in equal ordinate zones of $CA/2n$ where CA is the clear aperture of the lens surface, and n is the number of zones, and the sag Z in successive zones is defined by a family of successive equations $Z_1$ to $Z_n$ $$Z_1 = a_1 + b_1 p_1 + \frac{C_1}{2} p_1^2 + \frac{d_1}{6} p_1^3$$

$$Z_n = a_n + b_n(p_n - p_{n-1}) + \frac{C_n}{2}(p_n - p_{n-1})^2 + \frac{d_n}{6}(p_n - p_{n-1})^3$$

12. A lens according to claim 11 scaled to an EFL of 300 mm and relative aperture of f/1.65 described substantially as follows:

| | | Surface Radius (mm) | Axial Distance Between Surfaces (mm) | $N_d$ | $V_d$ |
|---|---|---|---|---|---|
| | S1 | 521.31 | | | |
| L1 | | | 20.00 | 1.491 | 57.2 |
| | S2 | ∞ | | | |
| | | | 319.32 | | |
| | S3 | 241.48 | | | |
| L2 | | | 65.00 | 1.491 | 57.2 |
| | S4 | −345.77 | | | |
| | | | 191.14 | | |
| | S5 | −74.54 | | | |
| L3 | | | 6.67 | 1.491 | 57.2 |
| | S6 | −902.23 | | | |
| | | | 61.57 | | |

Aspheric Surfaces: S1, S3, S4 and S5

| Surface | Clear Aperture | $d_1$ | $d_2$ | $d_3$ | $d_4$ | $d_5$ |
|---|---|---|---|---|---|---|
| 1 | 350.2mm | $-.1339 \times 10^{-5}$ | $-.1157 \times 10^{-4}$ | $-.2105 \times 10^{-4}$ | $-.3353 \times 10^{-4}$ | $-.1091 \times 10^{-3}$ |
| 3 | 264.9mm | $-.6323 \times 10^{-6}$ | $.9887 \times 10^{-5}$ | $.2084 \times 10^{-4}$ | $.4407 \times 10^{-4}$ | $.5742 \times 10^{-4}$ |
| 4 | 263.1mm | $2283 \times 10^{-5}$ | $.1260 \times 10^{-4}$ | $.3264 \times 10^{-4}$ | $.2877 \times 10^{-4}$ | $.2647 \times 10^{-4}$ |
| 5 | 203.5mm | $.3889 \times 10^{-4}$ | $.8169 \times 10^{-4}$ | $.4289 \times 10^{-4}$ | $.1134 \times 10^{-3}$ | $.9075$ |

Where $N_d$ is the index of refraction of the lens elements, $V_d$ is the dispersion of the lens measured by its Abbe number, S1–S6 are succesive lens surfaces, the surfaces where positive are on radii struck from the right and where negative are on radii struck from the left, and surfaces S1, S3, S4 and S5 are aspheric as shown.

13. A lens according to claim 11 scaled to an EFL of 127 mm and a relative aperture of f/1.09 described substantially as follows:

| | | Surface Radius (mm) | Axial Distance Between Surfaces (mm) | $N_d$ | $V_d$ |
|---|---|---|---|---|---|
| | S1 | 301.79 | | | |
| L1 | | | 10.00 | 1.491 | 57.2 |
| | S2 | ∞ | | | |
| | | | 80.25 | | |
| | S3 | 85.57 | | | |
| L2 | | | 42.00 | 1.491 | 57.2 |
| | S4 | −175.33 | | | |
| | | | 72.67 | | |
| | S5 | −51.53 | | | |
| L3 | | | 3.00 | 1.491 | 57.2 |
| | S6 | 351.42 | | | |

Aspheric Surfaces: S1, S4, S5 and S6

| Surface | Clear Aperture | $d_1$ | $d_2$ | $d_3$ | $d_4$ | $d_5$ |
|---|---|---|---|---|---|---|
| 1 | 131.0mm | $-.3644 \times 10^{-5}$ | $-.8165 \times 10^{-4}$ | $-.1221 \times 10^{-3}$ | $-.2479 \times 10^{-3}$ | $-.4656 \times 10^{-3}$ |
| 4 | 128.6mm | $.3149 \times 10^{-4}$ | $.9809 \times 10^{-4}$ | $.1503 \times 10^{-3}$ | $.2306 \times 10^{-3}$ | $.2190 \times 10^{-3}$ |
| 5 | 87.0mm | $.2611 \times 10^{-3}$ | $-.2312 \times 10^{-2}$ | $.5645 \times 10^{-3}$ | $-.1836 \times 10^{-2}$ | $-.8412 \times 10^{-2}$ |

-continued

| | | | | | | |
|---|---|---|---|---|---|---|
| 6 | 120.00mm | $-.2975 \times 10^{-3}$ | $-.1110 \times 10^{-2}$ | $.8117 \times 10^{-3}$ | $-.5917 \times 10^{-3}$ | $-.3518 \times 10^{-2}$ |

Where $N_d$ is the index of refraction of the lens elements, $V_d$ is the dispersion of the lens measured by its Abbe number, S1–S6 are successive lens surfaces, the surfaces where positive are on radii struck from the right and where negative are on radii struck from the left, and surfaces S1, S4, S5 and S6 are aspheric as shown.

14. A lens according to claim 11 scaled to an EFL of 135 mm and a relative aperture of f/1.09 described substantially as follows:

| | | Surface Radius (mm) | Axial Distance Between Surfaces (mm) | $N_d$ | $V_d$ |
|---|---|---|---|---|---|
| | S1 | 223.69 | | | |
| L1 | | | 10.00 | 1.491 | 57.2 |
| | S2 | ∞ | | | |
| | | | 72.08 | | |
| | S3 | 108.36 | | | |
| | | | 42.00 | | |
| L2 | | | | 1.491 | 57.2 |
| | S4 | −167.46 | | | |
| | | | 77.00 | | |
| | S5 | −57.16 | | | |
| | | | 3.00 | | |
| L3 | | | | 1.491 | 57.2 |
| | S6 | ∞ | | | |

Aspheric Surfaces: Where S3, S4, S5, S6

| Surface | Clear Aperture | $d_1$ | $d_2$ | $d_3$ | $d_4$ | $d_5$ |
|---|---|---|---|---|---|---|
| 1 | 159.9mm | $-.1281 \times 10^{-4}$ | $-.8022 \times 10^{-4}$ | $-.1247 \times 10^{-3}$ | $-.2662 \times 10^{-3}$ | $-.4792 \times 10^{-3}$ |
| 3 | 140.0mm | $.2623 \times 10^{-4}$ | $.9881 \times 10^{-4}$ | $.1802 \times 10^{-3}$ | $.2040 \times 10^{-3}$ | $-.2553 \times 10^{-3}$ |
| 4 | 138.4mm | $.1829 \times 10^{-4}$ | $.7667 \times 10^{-4}$ | $.8617 \times 10^{-4}$ | $.2826 \times 10^{-4}$ | $-.9310 \times 10^{-4}$ |
| 5 | 90.9mm | $-.1180 \times 10^{-2}$ | $.7727 \times 10^{-3}$ | $-.1321 \times 10^{-2}$ | $-.2786 \times 10^{-2}$ | $-.5550$ |
| 6 | 130.0mm | $-.1590 \times 10^{-2}$ | $.1300 \times 10^{-2}$ | $-.5869 \times 10^{-3}$ | $-.8199 \times 10^{-3}$ | $-.1199 \times 10^{-2}$ | where $N_d$ is the index of refraction of the lens elements, $V_d$ is the dispersion of the lens measured by its Abbe number, S1–S6 are successive lens surfaces, the surfaces where positive are on radii struck from the right and where negative are on radii struck from the left, and surfaces S1, S3, S4, S5, and S6 are aspheric as shown.

15. A lens according to claim 11 scaled to an EFL of 127 mm and a relative aperture of f/1.09 described substantially as follows:

| | | Surface Radius (mm) | Axial distance Between Surfaces (mm) | $N_d$ | $V_d$ |
|---|---|---|---|---|---|
| | S1 | 237.45 | | | |
| L1 | | | 10.00 | 1.491 | 57.2 |
| | S2 | ∞ | | | |
| | | | 71.28 | | |
| | S3 | 93.45 | | | |
| | | | 42.00 | | |
| L2 | | | | 1.491 | 57.2 |
| | S4 | −166.02 | | | |
| | | | 70.77 | | |
| | S5 | −61.94 | | | |
| | | | 3.00 | | |
| L3 | | | | 1.491 | 57.2 |
| | S6 | 163.78 | | | |

Aspheric Surfaces: S1, S3, S4, S5 and S6

| Surface | Clear Aperture | $d_1$ | $d_2$ | $d_3$ | $d_4$ | $d_5$ |
|---|---|---|---|---|---|---|
| 1 | 130.2mm | $-.1695 \times 10^{-4}$ | $-.8422 \times 10^{-4}$ | $-.1463 \times 10^{-3}$ | $-.3004 \times 10^{-3}$ | $-.5393 \times 10^{-3}$ |
| 3 | 130.6mm | $.3487 \times 10^{-4}$ | $.1080 \times 10^{-3}$ | $.1869 \times 10^{-3}$ | $.1941 \times 10^{-3}$ | $-.1384 \times 10^{-3}$ |
| 4 | 127.9mm | $.2274 \times 10^{-4}$ | $.8446 \times 10^{-4}$ | $.7853 \times 10^{-4}$ | $.4268 \times 10^{-4}$ | $-.3505 \times 10^{-4}$ |
| 5 | 81.0mm | $-.1439 \times 10^{-2}$ | $-.2149 \times 10^{-3}$ | $-.6393 \times 10^{-4}$ | $-.2034 \times 10^{-2}$ | $-.1134 \times 10^{-1}$ |
| 6 | 110.0mm | $-.1661 \times 10^{-2}$ | $.6148 \times 10^{-3}$ | $-.3317 \times 10^{-4}$ | $-.8751 \times 10^{-3}$ | $-.5471 \times 10^{-2}$ |

Where $N_d$ is the index of refraction of the lens elements, $V_d$ is the dispersion of the lens measured by its Abbe number, S1–S6 are successive lens surfaces, the surfaces where positive are on radii struck from the right and where negative are radii struck from the left, and surfaces S1, S3, S4, S5 and S6 are aspheric as shown.

16. A lens according to claim 11 scaled to an EFL of 135 mm and a relative aperture of f/1.09 described substantially as follows:

|  |  | Surface Radius (mm) | Axial Distance Between Surfaces (mm) | $N_d$ | $V_d$ |
|---|---|---|---|---|---|
| L1 | S1 | 215.86 |  |  |  |
|  |  |  | 10.00 |  |  |
|  | S2 | ∞ |  | 1.491 | 57.2 |
|  |  |  | 66.191 |  |  |
|  | S3 | 137.50 |  |  |  |
|  |  |  | 42.00 |  |  |
| L2 |  |  |  | 1.491 | 57.2 |
|  | S4 | −136.15 |  |  |  |
|  |  |  | 82.22 |  |  |
|  | S5 | −65.47 |  |  |  |
|  |  |  | 3.00 |  |  |
| L3 |  |  |  | 1.491 | 57.2 |
|  | S6 | ∞ |  |  |  |

Aspheric Surfaces: S1, S3, S4, and S5

| Surface | Clear Aperture | $d_1$ | $d_2$ | $d_3$ | $d_4$ | $d_5$ |
|---|---|---|---|---|---|---|
| 1 | 154.5mm | $-.2026 \times 10^{-4}$ | $-.8525 \times 10^{-4}$ | $-.1549 \times 10^{-3}$ | $-.3448 \times 10^{-3}$ | $-.8040 \times 10^{-3}$ |
| 3 | 140.7mm | $.2337 \times 10^{-4}$ | $.4685 \times 10^{-4}$ | $.1282 \times 10^{-3}$ | $.1955 \times 10^{-3}$ | $-.2588 \times 10^{-4}$ |
| 4 | 138.4mm | $.2105 \times 10^{-4}$ | $.4532 \times 10^{-4}$ | $.1085 \times 10^{-3}$ | $.7632 \times 10^{-4}$ | $-.2740 \times 10^{-4}$ |
| 5 | 98.1mm | $-.4466 \times 10^{-4}$ | $-.4340 \times 10^{-3}$ | $-.6891 \times 10^{-3}$ | $-.1342 \times 10^{-2}$ | $-.2958 \times 10^{-2}$ |

Where $N_d$ is the index of refraction of the lens elements, $V_d$ is the dispersion of the lens measured by its Abbe number, S1–S6 are successive lens surfaces, the surfaces where positive are on radii struck from the right and where negative are on radii struck from the left, and surfaces S1, S3, S4 and S5 are aspheric as shown.

17. A projection lens for a cathode ray tube display comprising three groups, the first group from the image end being of weak optical power serving primarily to correct for aperture dependent aberrations, the second group providing essentially all of the positive power of the overall lens, the third group being negative and serving as a field flattener essentially correcting the Petzval curvature of the elements of said first and second groups, said three groups having optical powers K1, K2 and K3, respectively, the overall lens having an optical power of 1.0, and

| | | | | |
|---|---|---|---|---|
| .4 | > | K1 | > | .1 |
| 1.1 | > | K2 | > | .85 |
| −1.9 | > | K3 | > | −1.0 |

18. The lens of claim 17 where the second group consists of one element, and an element of each of the first and third groups has a plano surface.

19. The lens of claim 18 where the element of each of said first and third groups has an aspheric surface.

20. The lens of claim 17 where the axial spacing between the surfaces of the second and third groups is between 0.5 and 0.7 of the equivalent focal length of said lens.

21. The lens of claim 17 wherein said second group consists of a single bi-convex element having at least one aspheric surface.

22. A projection lens for a cathode ray tube display comprising three groups, the first group from the image end being of weak optical power and serving primarily to correct for aperture dependent aberrations, the second group providing essentially all of the positive power of the overall lens, the third group being of negative power having an aspheric surface concave to the image end and serving as a field flattener essentially correcting the Petzval curvature of the elements of said first and second groups, the axial spacing between said second and third groups being between 0.5 and 0.7 of the equivalent focal length of said lens.

23. The lens of claim 22 where said three groups comprise three elements L1, L2, and L3, having optical powers K1, K2 and K3, the overall lens having an optical power of 1.0, and

| | | | | |
|---|---|---|---|---|
| .4 | > | K1 | > | .1 |
| 1.1 | > | K2 | > | .85 |
| −1.9 | > | K3 | > | −1.0 |

24. The lens of claim 23 where each group consists of one element, and the element of each of the first and third groups has a plano surface.

25. The lens of claim 24 where the element of each of said first and third groups has an aspheric surface.

26. The lens of claim 22 where the axial spacing between the surfaces of the second and third groups is between 0.5 and 0.7 of the equivalent focal length of said lens.

27. The lens of claim 22 wherein said second group consists of a single bi-convex element having at least one aspheric surface.

28. The lens of claim 22 where the axial distance between said first and second groups is between 0.4 and 1.1 of the equivalent focal length of said lens.

29. A projection lens for a cathode ray tube display consisting of three groups and comprising from the image side a first group of relatively weak optical power and having an aspheric surface, a second group of relatively strong positive power including a bi-convex element, and a third negative group comprising an element having an aspheric surface concave to the image side, and serving as a field flattener essentially correcting the Petzval curvature of the elements of said first and second groups.

30. The lens of claim 29 where the object side surface of said element of said third group is plano.

31. The lens of claim 29 where the image side surface of said first group is aspheric, and the object side surface of said bi-convex element is aspheric.

32. The lens of claim 31 where the object side surface of said bi-convex element is also aspheric.

33. The lens of claim 29 where said first, second, and third groups have optical powers $K_1$, $K_2$, and $K_3$ respectively, the overall optical power of the lens is 1.0, and

| | | | | |
|---|---|---|---|---|
| .4 | > | K1 | > | .1 |
| 1.1 | > | K2 | > | .85 |
| −1.9 | > | K3 | > | −1.0 |

34. The lens of claim 29 where the axial spacing between the surfaces of the second and third group is between 0.5 and 0.7 of the equivalent focal length of said lens.

35. A projection lens for a cathode ray tube display comprising from the image end a first group of positive power having an aspheric surface and being of relatively weak optical power, said first group serving to correct for aperture dependent aberrations, a second group of relatively strong positive power and having at least one aspheric surface, and a third group comprising an element having an aspheric surface concave to the image end and essentially correcting the Petzval curvature of the elements of said first and second groups.

36. The lens of claim 35 where the axial spacing between said first and second groups is between 0.4 and 1.1 of the equivalent focal length of the lens.

37. The lens of claim 35 where the axial spacing between said second and third groups in 0.5 to 0.7 of the equivalent focal length of said lens.

* * * * *

UNITED STATES PATENT AND TRADEMARK OFFICE
CERTIFICATE OF CORRECTION

PATENT NO. : 4,300,817
DATED : November 17, 1981
INVENTOR(S) : Ellis I. Betensky It is certified that error appears in the above-identified patent and that said Letters Patent are hereby corrected as shown below:

Column 4, Line 65, after the word "with": Change "the i th zone . ." to read: -- the 1st zone . . --

Column 15, Claim 14, Line 20, next to heading "Aspheric Surfaces" "Where S3, S4, S5, S6" should read:
-- Where S1, S3, S4, S5, S6 --

Column 17, Claim 16, Line 19: Under subheading "$d_1$", opposite "Surface 5", change "-.4466" to read:
-- -.4460 --

Signed and Sealed this

Eighteenth Day of May 1982

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,300,817
DATED : November 17, 1981
INVENTOR(S) : Ellis I. Betensky It is certified that error appears in the above-identified patent and that said Letters Patent are hereby corrected as shown below:

Column 18, Line 65, change "object" to -- image --.

Signed and Sealed this

Twenty-fourth Day of March, 1987

*Attest:*

DONALD J. QUIGG

*Attesting Officer*   *Commissioner of Patents and Trademarks*